United States Patent [19]

Shults et al.

[11] 4,030,935

[45] June 21, 1977

[54] GLASS

[76] Inventors: Mikhail Mikhailovich Shults, prospekt Engelsa, 63, korpus 3, kv. 51; Anatoly Ivanovich Parfenov, Novocherkassky prospekt, 40, kv. 30, both of Leningrad; Alexandr Dmitrievich Shnypikov, Gatchinsky raion poselok Kummunar, ulitsa Pionerskaya, 11, kv. 64, Leningradskaya oblast; Vladimir Georgievich Krunchak, Institutsky prospekt, 9, kv. 49; Sarra Borisovna Evnina, V.O. 15 Linia, 16, kv. 19, both of Leningrad; Vladimir Alexandrovich Dolidze, ulitsa Sergo Zakariadze, 10, kv. 10; Valentina Mikhailovna Tarasova, prospekt Plekhanova, 148, kv. 19, both of Tbilisi, all of U.S.S.R.

[22] Filed: Apr. 22, 1976

[21] Appl. No.: 679,485

[52] U.S. Cl. .................................................. 106/52
[51] Int. Cl.$^2$ ...................... C03C 3/04; C03C 3/10
[58] Field of Search ...................................... 106/52

[56] References Cited
FOREIGN PATENTS OR APPLICATIONS
147,297    0000    U.S.S.R.

OTHER PUBLICATIONS

"Glass Production Handbook," vol. 1, Moscow, 1970, p. 777.

*Primary Examiner*—Winston A. Douglas
*Assistant Examiner*—Mark Bell
*Attorney, Agent, or Firm*—Robert E. Burns; Emmanuel J. Lobato; Bruce L. Adams

[57] ABSTRACT

The present invention relates to glass which comprises the oxides of silicon, zirconium, aluminum, lanthanum, strontium, calcium, sodium, lithium, and potassium. The content of these components in the proposed glass, in terms of percent by weight, is as follows:

| | |
|---|---|
| silicon dioxide | 58.5 to 64.7 |
| zirconium dioxide | 14.1 to 20.0 |
| aluminum oxide | 3.0 to 0.1 |
| lanthanum oxide | 0.1 to 3.0 |
| strontium oxide | 0.1 to 4.0 |
| calcium oxide | 3.0 to 0.1 |
| sodium oxide | 6.0 to 0.1 |
| lithium oxide | 1.2 to 5.0 |
| potassium oxide | 14.0 to 3.0 |

The glass of the present invention possesses high chemical stability in solutions containing large amounts of alkali and soda and can be used at temperatures of up to 150° C.

1 Claim, No Drawings

GLASS

The present invention relates to glass. Glass manufactured in accordance with the invention can be used for making glass electrode shells and is applicable in instrument making and the construction materials industry.

There is known glass having the following composition, in terms of percent by weight:

| | | |
|---|---|---|
| silicon dioxide | | 69.5 |
| calcium oxide | | 5.5 |
| magnesium oxide | | 3.5 |
| barium oxide | | 5.0 |
| sodium oxide | | 12.5 |
| potassium oxide | | 4.0 |
| iron oxide | not more than | 0.3 |

Glass of the above-mentioned composition is in the IV hydrolytic class. It finds application in the manufacture of electrode shells. It should be pointed out, however, that in media with a high alkali content and at elevated temperatures (100° to 150° C), the glass looses its chemical stability and dissolves.

There is also known glass comprising oxides of silicon, zirconium, aluminum, lanthanum, strontium, calcium, sodium, and lithium. The percent-by-weight content of these oxides is as follows:

| | |
|---|---|
| silicon dioxide | 62 to 63 |
| zirconium dioxide | 12 to 14 |
| aluminum oxide | 2.4 |
| lanthanum oxide | 2.4 |
| strontium oxide | 4.0 |
| calcium oxide | 4.0 |
| sodium oxide | 10 to 12 |
| lithium oxide | 1 to 2 |

Glass of the two foregoing types is well smelted and clarified at temperatures of 1,420° to 1,440° C and is applicable for the manufacture of chemical glassware. The physico-chemical properties of these types of glass are as follows:

| | |
|---|---|
| thermal expansion coefficient, | $(65 \pm 2) \cdot 10^7$ cm per ° C |
| thermal stability, chemical | 130° C |
| chemical stability (weight losses, mg/100 cm²) at 90° C in 1.0 N solution of sodium hydroxide, | 10 to 12 |
| in 2.0 N mixture of sodium hydroxide and soda, at 150° C | 25 to 28, the glass dissolves. |

Thus, glasses of the aforementioned types cannot be soldered to platinum and thus cannot be used for electrode glass used in pH measurements; this glass shows low chemical stability at temperatures of above 100° C and cannot be used for the manufacture of electrodes.

It is an object of the present invention avoid said drawbacks.

The foregoing object is attained by providing glass comprising oxides of silicon, zirconium, aluminum, lanthanum, strontium, calcium, sodium, and lithium, which glass also includes, in accordance with the invention, potassium oxide and has the following percent-by-weight ratio of its ingredients:

| | |
|---|---|
| silicon dioxide | 58.5 to 64.7 |
| zirconium dioxide | 14.1 to 20.0 |
| aluminium oxide | 3.0 to 0.1 |
| lanthanum oxide | 0.1 to 3.0 |
| strontium oxide | 0.1 to 4.0 |
| calcium oxide | 3.0 to 0.1 |
| sodium oxide | 6.0 to 0.1 |
| lithium oxide | 1.2 to 5.0 |
| potassium oxide | 14.0 to 3.0 |

The introduction of the above-mentioned amount of potassium oxide made it possible to raise the electric resistance of the glass to as high as 115 hectohms. The introduction of the above-mentioned amount of zirconium dioxide considerably improves the chemical stability of the glass; the remaining ingredients, taken in the above-mentioned quantities account for high technological effectiveness of the glass smelting process, as well as for a change in the thermal linear expansion coefficient of the glass from $12 \cdot 10^{-7}$ to $98 \cdot 10^{-7}$ cm per ° C.

The proposed glass is manufactured from powder-like oxides of silicon, zirconium, aluminum, lathanum, strontium, calcium, sodium, lithium, and potassium taken in the above-mentioned quantities with due regard for their humidity. The charge, composed of the aforesaid oxides is weighed, and a certain amount of charcoal is added thereto. The charge is then placed in a quartz vessel preheated to about 500° C. The quartz container is put into a furnace whose temperature is raised to 1,100° C, at which temperature the glass mass is maintained for 1.0 to 1.5 hours. This is followed by raising the temperature, at the maximum rate for the given furnace, to 1,480° to 1,500° C. At this temperature the glass mass is maintained for no less than 3 hours.

The glass thus obtained was used to manufacture test tubes and sodium function glass electrodes. The chemical stability of the glass was checked in 2.0 N solutions of sodium hydroxide and sodium carbonate. The criterion for evaluating the chemical stability of the glass was the change in the weight of the glass per 100 cm² ($\Delta p/S$ mg/100 cm²). The testing time was 6 hours. The tests show that the chemical stability of the glass according to the invention is 4 to 10 times as great as that of the known types of glass; at 100° C, the electric resistance of the proposed type of glass is at least 10,000 times as high as that of the known types of glass, and is even 100,000 times as high at temperatures of 100° to 150° C. Data on the chemical stability of the proposed type of glass are listed in the following table.

| | | | $\frac{\Delta p}{S}$ mg/100 cm² | |
|---|---|---|---|---|
| Serial No | Solution | Temperature, ° C | Proposed glass | Glass according to USSR Inventor's Certificate No 147297 | Glass according to "Glass Production Handbook", vol. 1, Moscow, 1970, p.777 |
| 1. | 2.0 N solution of sodium hydroxide | 90 | 15 | 23 | 67 |
| | | 150 | 123 | 480 | 1350 |
| 2. | 2.0 N solution of sodium carbonate | 90 | 10 | 10 | 110 |
| | | 150 | 56 | 510 | 1800 |

The table lists glass according to USSR Inventor's Certificate No 147,297. This glass has the following composition in terms of percent by weight:

| silicon dioxide | 62 to 63 |
| --- | --- |
| zirconium dioxide | 12 to 14 |
| aluminum oxide | 2.4 |
| lanthanum oxide | 2.4 |
| strontium oxide | 4.0 |
| calcium oxide | 4.0 |
| sodium oxide | 10 to 12 |
| lithium oxide | 1 to 2 |

The glass described in the "Glass Production Handbook" has the following composition, in terms of percent by weight:

| silicon dioxide | | 69.5 |
| --- | --- | --- |
| calcium oxide | | 5.5 |
| magnesium oxide | | 3.5 |
| barium oxide | | 5.0 |
| sodium oxide | | 12.5 |
| potassium oxide | | 4.0 |
| iron oxide | not more than | 0.3 |

Thus, the proposed type of glass possesses high chemical stability at temperatures of 90° to 150° C and a temperature linear expansion coefficient between $12 \cdot 10^{-7}$ and $90 \cdot 10^{-7}$ cm per 1° C; the proposed type of glass has an electric resistance of 115 hectohms and can be recommended for the manufacture of glass electrode shells, as well as special-purpose instruments and construction materials.

The objects and advantages of the present invention will be better understood from the following examples of preferred embodiments thereof.

EXAMPLE 1.

The glass has the following composition, in terms of percent by weight:

| silicon dioxide | 58.52 |
| --- | --- |
| potassium oxide | 11.79 |
| lithium oxide | 3.76 |
| sodium oxide | 1.99 |
| calcium oxide | 2.48 |
| strontium oxide | 3.06 |
| aluminum oxide | 1.96 |
| lanthanum oxide | 1.92 |
| zirconium dioxide | 14.52 |

The glass of the above composition has a high electric resistance which is equal to 100 hectohms. In 2.0 N solution of sodium hydroxide and at 150° C, the change in the weight of the glass amounts to 130 mg/100 cm²; for 2.0 N solution of sodium carbonate, the figure is 60 mg/100 cm². The chemical stability of the glass was tested in aggressive media used in the pulp and paper industry. In cooking liquor and at 150° C, the weight of the glass changes by 238 mg/100 cm²; in black liquor, the change in the weight of the glass amounts to 22 mg/100 cm². This glass is used to manufacture sodium-function glass electrode shells.

EXAMPLE 2

The glass has the following composition, in terms of percent by weight:

| silicon dioxide | 59.68 |
| --- | --- |
| potassium oxide | 7.70 |
| lithium oxide | 2.46 |
| sodium oxide | 6.00 |
| calcium oxide | 2.50 |
| strontium oxide | 3.09 |
| aluminum oxide | 1.98 |
| lanthanum oxide | 1.94 |
| zirconium oxide | 14.65 |

The electric resistance of this type of glass is 78 hectohms. The temperature linear expansion coefficient is $90 \cdot 10^{-7}$ cm per ° C. The glass is readily soldered to different glass indicator diaphragms of electrodes for measuring pH, pNk and pK. The chemical stability of this type of glass is similar to that of the glass of Example 1.

EXAMPLE 3

The glass has the following composition, in terms of percent by weight:

| silicon dioxide | 60.0 |
| --- | --- |
| potassium oxide | 3.0 |
| lithium oxide | 1.2 |
| sodium oxide | 3.0 |
| calcium oxide | 3.0 |
| strontium oxide | 4.0 |
| aluminum oxide | 3.0 |
| lanthanum oxide | 2.0 |
| zirconium dioxide | 20.0 |

The electric resistance of this type of glass is 62 hectohms. The temperature linear expansion coefficient is b $52 \cdot 10^{-7}$ cm per ° C. The glass possesses a maximum chemical stability.

In cooking liquor solutions and at 150° C, $\Delta p/S$ amounts to 215 mg/100 cm²; in black liquor solutions it amounts to 20 mg/100 cm²; in 2.0 N solution of sodium carbonate, it amounts to 48 mg/100 cm²; and in 2.0 N solution of sodium hydroxide, to 118 mg/cm².

The glass of the foregoing composition is applicable for the manufacture of glass electrode shells and piping for aggressive media.

EXAMPLE 4

The glass has the following compositon, in terms of percent by weight:

| silicon dioxide | 64.7 |
| --- | --- |
| potassium oxide | 14.0 |
| lanthanum oxide | 0.1 |
| lithium oxide | 5.0 |
| sodium oxide | 0.1 |
| calcium oxide | 0.1 |
| strontium oxide | 0.1 |
| aluminum oxide | 0.1 |
| zirconium dioxide | 15.8 |

The glass has an electric resistance of 115 hectohms. The temperature linear expansion coefficient is $92 \cdot 10^{-7}$ cm per ° C. The chemical stability of this type of glass is similar to that of the glass described in Example 1. The glass of the foregoing compositon is readily soldered to different glass indicator diaphragms of ion selective electrodes.

What is claimed is:

1. Glass essentially consisting of the following components, in terms of percent by weight:

| silicon dioxide | 58.5 to 64.7 |
| --- | --- |
| zirconium dioxide | 14.1 to 20.0 |
| aluminum oxide | 0.1 to 3.0 |
| lanthanum oxide | 0.1 to 3.0 |
| strontium oxide | 0.1 to 4.0 |
| calcium oxide | 0.1 to 3.0 |
| sodium oxide | 0.1 to 6.0 |
| lithium oxide | 1.2 to 5.0 |
| potassium oxide | 3.0 to 14.0 |

* * * * *